J. CARR.
Horse-Detacher.

No. 215,879.　　　　　Patented May 27, 1879.

Witnesses.
S. W. Sangster
A. G. Thum

Inventor.
John Carr.
By James Sangster
Atty.

UNITED STATES PATENT OFFICE.

JOHN CARR, OF BOSTON, MASSACHUSETTS.

IMPROVEMENT IN HORSE-DETACHERS.

Specification forming part of Letters Patent No. 215,879, dated May 27, 1879; application filed February 3, 1879.

*To all whom it may concern:*

Be it known that I, JOHN CARR, of the city of Boston, in the county of Suffolk and State of Massachusetts, have invented certain new and useful Improvements in Horse-Detachers, which improvements are fully set forth in the following specification and accompanying drawings, in which—

Figure 1:
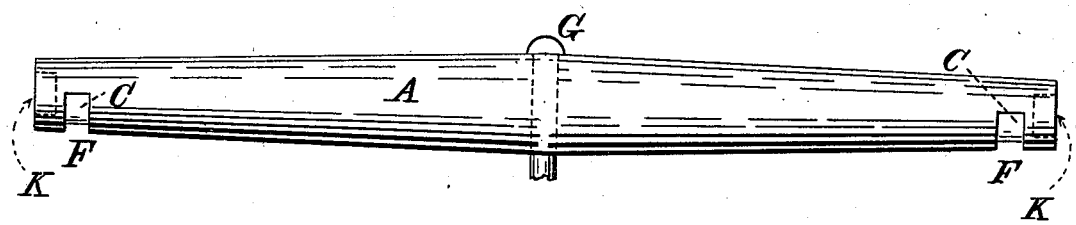
Figure 2:
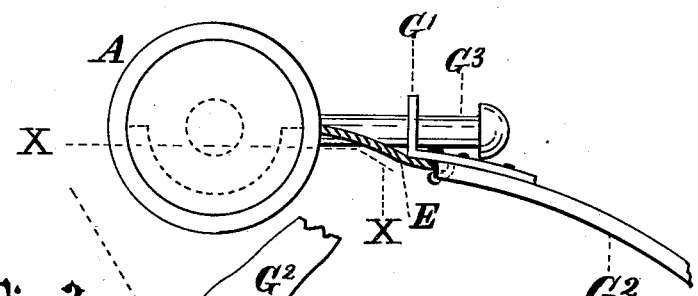
Figure 3:
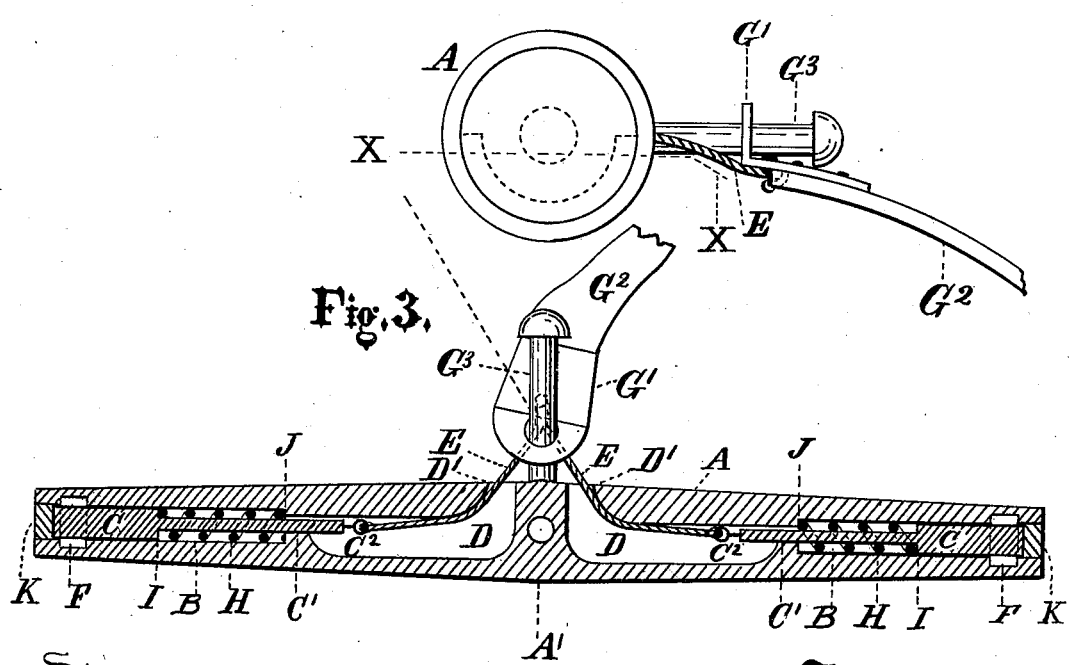

Figure 1 is a side elevation; Fig. 2, an end view, enlarged; and Fig. 3 represents a longitudinal section through line X X, Fig. 2, on a smaller scale.

The object of this invention is to insure an equal pull upon both detaching-cords at whatever angle the operating-strap is drawn, as will be more readily understood by reference to the drawings, in which A represents the whiffletree or body of the detaching device. It is formed of one piece of malleable cast-iron, having chambers or openings B for the bolts C to work in, and passages D for the cords, chains, or flexible wire cables E, also openings F, to receive the traces, and a center portion, A', through which the bolt G passes, and a projecting bar, $G^3$.

The bolts C, which secure the traces by passing through a hole or eye in the end, are provided with a stem or portion of smaller diameter, C', to receive the spiral springs H, which are kept in place by the shoulders I J.

The letters K represent openings through which the bolts C and springs are passed, which openings are afterward plugged or otherwise filled up, so as to prevent the springs H from forcing the bolts C out of place.

If desired, the holes K may be only partly filled, so as to leave a depression for the ends of the bolts C to slip into, as shown.

The cords or straps E are secured in any convenient way (that shown in the drawings answers a good purpose) to the bolts at $C^2$, and pass through the passages D and out at D', where they are fastened to a perforated plate or ring, $G^1$, having a strap, $G^2$, long enough to reach into the vehicle. The ring or perforated plates $G^1$ passes over the pin or bar $G^3$, as shown, so as to move easily along it.

The operation will be readily understood by reference to Fig. 3. A pull on the end of the strap $G^2$ will draw the bolts C toward the center of the whiffletree or body A, and consequently out from the traces, thereby releasing them, and when the strap $G^2$ is released the springs H will force the bolts back again.

It will be seen that a pull on the strap will cause the ring $G^1$ (or plate) to move at right angles to the whiffletree, so as to draw equally on both cords, even though the end should be drawn either to the right or left, and thereby operate both cords and bolts at exactly the same time, so as to prevent any chance of accident by releasing one end before the other.

It will further be seen that the shoulders guide the straps E and render the use of pulleys unnecessary.

I claim as my invention—

In a horse-detacher, the combination of the body A, bolts C C, springs H H, and cords or straps E, connected to a ring or plate, $G^1$, and guide pin or bar $G^2$, on which the said plate slides, substantially as and for the purposes described.

JOHN CARR.

Witnesses:
JAMES SANGSTER,
DANL. H. BURTIS.